(12) United States Patent
Goswami et al.

(10) Patent No.: US 11,941,536 B2
(45) Date of Patent: *Mar. 26, 2024

(54) ENTITY LEARNING RECOGNITION

(71) Applicant: International Business Machines Corporation, Armonk, NY (US)

(72) Inventors: Gaurav Goswami, New Deli (IN); Sharathchandra Umapathirao Pankanti, Yorktown Heights, NY (US); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 333 days.

This patent is subject to a terminal disclaimer.

(21) Appl. No.: 17/482,613

(22) Filed: Sep. 23, 2021

(65) Prior Publication Data
US 2022/0012543 A1 Jan. 13, 2022

Related U.S. Application Data

(60) Continuation of application No. 17/243,786, filed on Apr. 29, 2021, which is a division of application No.
(Continued)

(51) Int. Cl.
*G06N 5/022* (2023.01)
*G06F 18/21* (2023.01)
(Continued)

(52) U.S. Cl.
CPC ......... *G06N 5/022* (2013.01); *G06F 18/2148* (2023.01); *G06F 18/217* (2023.01);
(Continued)

(58) Field of Classification Search
CPC .... G06N 5/022; G06N 20/00; G06F 18/2148; G06F 18/217; G06V 10/7747; G06V 10/776
See application file for complete search history.

(56) References Cited

U.S. PATENT DOCUMENTS 9,047,376 B2    6/2015    Wang et al.
9,443,155 B2    9/2016    Xiong
(Continued)

FOREIGN PATENT DOCUMENTS

| CN | 101159015 B | 12/2010 |
|----|-------------|---------|
| CN | 103984919 A | 8/2014 |
| CN | 104463091 A | 3/2015 |

OTHER PUBLICATIONS

Mel, et al. "The NIST Definition of Cloud Comoputing". Recommendations of the National Institute of Standards and Technology. Nov. 16, 2015.
(Continued)

*Primary Examiner* — Brandon J Miller
(74) *Attorney, Agent, or Firm* — Geoffrey K. Pechie; David Spalding

(57) ABSTRACT

An entity learning recognition method and computer program product include learning training a model based on a combination of an original entity and an augmented entity in an augmented database, where the entity includes an image that is used for a training of the model and where the training is based on a visual element portion of the image with added noise.

2 Claims, 4 Drawing Sheets

Related U.S. Application Data

15/472,837, filed on Mar. 29, 2017, now Pat. No. 11,093,796.

(51) Int. Cl.
  *G06F 18/214* (2023.01)
  *G06N 20/00* (2019.01)
  *G06V 10/774* (2022.01)
  *G06V 10/776* (2022.01)

(52) U.S. Cl.
  CPC ......... *G06N 20/00* (2019.01); *G06V 10/7747* (2022.01); *G06V 10/776* (2022.01)

(56) References Cited

U.S. PATENT DOCUMENTS

| | | | |
|---|---|---|---|
| 10,217,059 | B2 | 2/2019 | Yang |
| 11,093,796 | B2* | 8/2021 | Goswami ............... G06N 20/00 |
| 2015/0055834 | A1 | 2/2015 | Zou et al. |
| 2016/0140436 | A1* | 5/2016 | Yin ..................... G06F 18/2431 706/20 |
| 2017/0083751 | A1* | 3/2017 | Tuzel ....................... H04N 7/15 |

OTHER PUBLICATIONS

Charlie D. Frowd, et al., "EvoFIT: A Holistic, Evolutionary Facial Imaging Technique for Creating Composites" Department of Psychology, University of Stirling, UK. ACM Transactions on Applied Perceptions (TAP), vol. 1 No. 1, Jul. 2004, pp. 19-39.

Authors, et al.: Disclosed Anonymously, "Image Add-Ons Including Distortion Effect" An IP.com Prior Art Database Technical Disclosure. IP.com No. IPCOM000237764D. Jul. 9, 2014.

United States Notice of Allowance dated Apr. 15, 2021 in U.S. Appl. No. 15/472,837.

United States Office Action dated Mar. 9, 2021, in U.S. Appl. No. 15/472,837.

United States Office Action dated Sep. 20, 2020, in U.S. Appl. No. 15/472,837.

United States Office Action dated May 12, 2020, in U.S. Appl. No. 15/472,837.

United States Office Action dated Feb. 3, 2020, in U.S. Appl. No. 15/472,837.

United States Office Action dated Nov. 1, 2019, in U.S. Appl. No. 15/472,837.

United States Office Action dated Sep. 18, 2019, in U.S. Appl. No. 15/472,837.

United States Office Action dated May 29, 2019, in U.S. Appl. No. 15/472,837.

Gao (Gao, Quan-xue, Lei Zhang, and David Zhang. "Face recognition using FLDA with single training image per person." Applied Mathematics and Computation 205.2 (2008): 726-734.) (Year: 2008).

Chen (Chen, Songcan, Daoqiang Zhang, and Zhi-Hua Zhou. "Enhanced (PC) 2A for face recognition with one training image per person." Pattern Recognition Letters 25.10 (2004): 1173-1181.) (Year: 2004).

United States Office Action dated Sep. 26, 2023, in co-pending U.S. Appl. No. 17/243,786.

* cited by examiner

ENTITY LEARNING RECOGNITION

CROSS-REFERENCE TO RELATED APPLICATIONS

The present application is a Continuation Application of U.S. patent application Ser. No. 17/243,786, filed on Apr. 29, 2021, which is a Divisional Application of U.S. patent application Ser. No. 15/472,837, filed on Mar. 29, 2017, now U.S. Pat. No. 11,093,796, issued on Aug. 17, 2021, the entire contents of which are hereby incorporated by reference.

BACKGROUND

The present invention relates generally to an entity augmentation and recognition, and more particularly, but not by way of limitation, to learning to augment entity features such that the an augmented entity is still recognizable as original entity, while the augmented entity will produce a different feature representation.

SUMMARY

In an exemplary embodiment, the present invention can provide a computer-implemented method, including in the training phase: selecting a structural element from a plurality of structural elements, for one or more entities in a training database: associating the structural element with one or more attributes in an aspect of the entities, generating one or more augmented entities based on one or more combinations of the structural element and the attributes, and adding the augmented entities to the training database, training a model based on a combination of original entities and the augmented entities in the augmented database. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this invention is based may readily be utilized as a basis for the designing of other structures, methods and systems. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
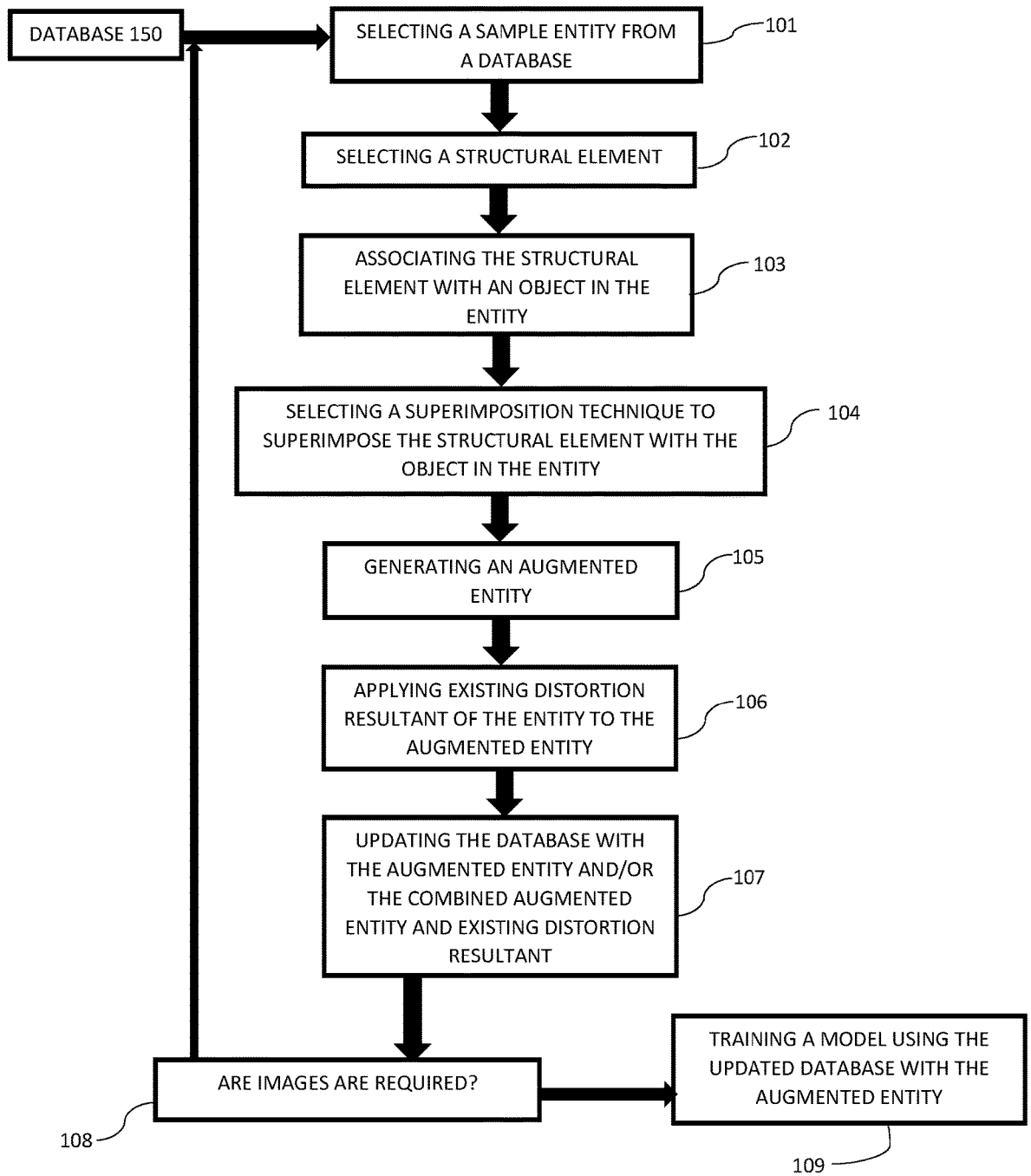
FIG. 1 exemplarily shows a high-level flow chart for an entity learning recognition method 100 according to an embodiment of the present invention.

The invention will now be described with reference to FIGS. 1-4, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of an entity learning recognition method 100 according to the present invention can include various steps for creating a large number of noisy entities for training and validation using each single entity, given limited training data or crawled data.

Figure 3:
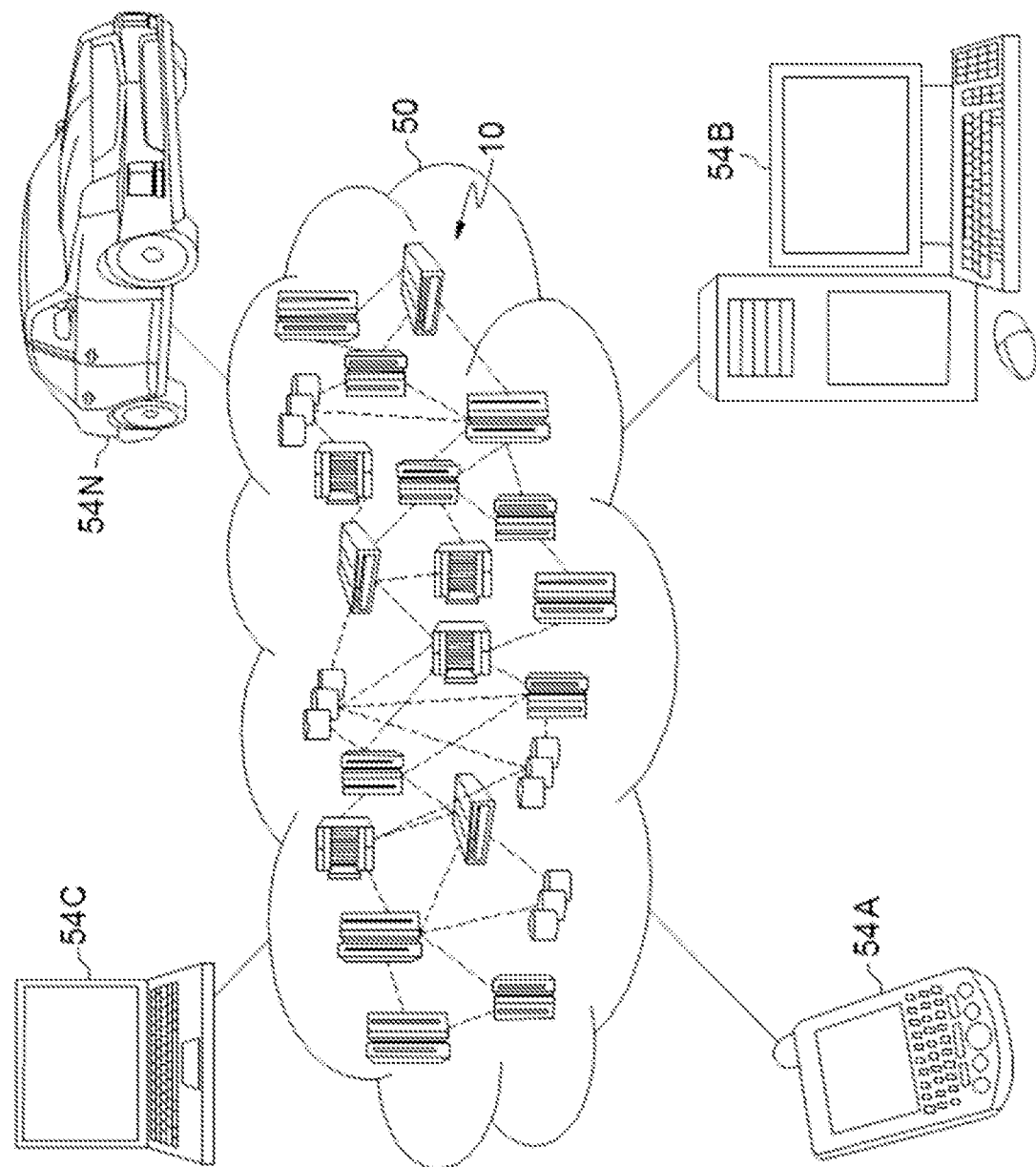
FIG. 3 depicts a cloud-computing environment 50 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Referring generally to the embodiments of the invention, some embodiments described herein provide a method of building a model of an object from entity data (e.g., images, grammar, rules, semantics, videos, etc.) by augmenting the available sample entities by enumerating artifacts undergone in each subsystem component of the visual recognition solution such as subsystems of record, insights, and engagement, modeling variation produced by each artifact in terms of one or more structural entity elements in relation to the object to be recognized where the relationship of the structural element with respect to the object depicted in the sample entity is characterized by a geometric transformation and one or more augmented entities are generated using additive or subtractive superimposition of the transformed structural element to the sample entity, and the augmented dataset is used for training the visual model.

In other words, different kinds of noise can be added to, for example, face images to generate virtually as many samples as desired. This can also make the learning more robust to attacks on the learnt network. The augmentation methods are relevant to the transformation processes a face may undergo in nature (e.g., pose, occlusion, lighting, resolution, blur, chronology, expression, decoration), the representations of face images captured in the legacy system of records (e.g., wrinkling, lamination, printing), the representation of the models of the system in system of insights (e.g., learnt models, fusion rules vulnerabilities), or in the systems of engagement (e.g., how the query images are different in terms of their natural degradation or adversarial mutilation).

Some embodiments of the invention produce augmented data samples that vary from the original sample substantially even after standard preprocessing techniques are applied. Such data samples can be utilized to improve the robustness of the learned model and treated as unique samples as compared to samples produced by existing techniques.

In some embodiments, given limited training data or even crawled data, each single image can result in a large number of noisy images (i.e., entities), that can be used for model training and/or validation. The model learns to produce transformed face images such that the output is still recognizable visually as the original subject but differs sufficiently to produce a different feature representation. The transformations are learned such that traditional preprocessing techniques cannot counteract them completely, thereby retaining their value in the training of noise-resistant and robust systems. Each augmented sample presents a challenging case to the representation and matching system at training time, enabling it to adapt the learned parameters since the cost function depends on correct classification of all cases. Some embodiments of the invention augment unlabeled and/or labeled data. In some embodiments, the model is aware of any associated data label(s) and the generated images are correspondingly automatically labeled.

With reference now to FIG. 1, in step 101, a sample entity is selected from a database 150. The sample entity can include one or more elements/objects, for example, an image, an audio file, a video file, a phrase, a sentence, language, etc. That is, the sample entity can include a plurality of different formats of files of which the elements can be augments. For example: a sentence entity can be augmented by adding noise to (or subtracting noise from) the entity to include errors in grammar, semantic errors, tense, etc; and an image entity can be augmented by adding noise to (or subtracting noise from) the entity (i.e., changing the image) as described later.

In step 102, a structural element of the entity is selected for augmentation (e.g., modification by adding noise to or subtracting noise from the element). For example, the structural element can include a shape to be aligned with eyes of a facial image, a semantic meaning, grid lines for an image, illumination changes, local area enhancements, etc.

In step 103, the selected structural element is associated with an element of the entity. For example: a shape may be associated with the eyes of a face in an image; and a semantic meaning can be associated with a word or fragment of a sentence, etc.

In step 104, a superimposition technique is selected to superimpose the selected structural element on the associated element.

In step 105, an augmented entity is generated via the selected superimposition technique e.g., the structural element is superimposed on the object in the entity. In other words, one or more augmented entities are generated based on a combination of the structural element with the element of the entity.

By way of a specific (but non-limiting) example, given a corpus of entities, denoted by F, the data augmentation can begin by selecting a distortion model, D(.) from an available set of distortion models and transforms the entity to create an extended entity corpus D(F). Standard preprocessing techniques are applied to D(F) and then an entity reconstruction algorithm attempts to reconstruct F from D(F) where F=R(D(F))+e, where, e is the reconstruction error and R is the transformation that the reconstruction model uses to reconstruct F from D(F). The value of e is looped back to the data augmentation model which can then tune/select transforms based on whether e was high (e.g., D(F) is substantially different from F or e was low (e.g., D(F) is almost the same as F). In some embodiments, only transforms (R) that produce substantially different output than the original corpus are retained and used for data augmentation. That is, R is selected based on the value of e and the training model is limited to one or more of R that produce a reconstructed object image (F') exceeding a threshold value.

In step 106, known distortion resultants (i.e., rotation, scaling, etc.) of the entity are applied to the augmented entity. In other words, if N is the generated augmented entity (entities) and if M is the existing distortion resultants of the database 150 either from previously generated augmented entities or from prior techniques, N+M is the updated entities. In this manner, the method 100 can seamlessly operate with existing techniques and efficiently supplement or enhance a database in the training phase.

In step 107, the database is updated to include the augmented entity and/or the combined augmented entity and existing distortion resultant (e.g., the augment entity is added to (stored in) the database 150 or the combination from step 106 (the augmented entity and existing distortion resultant) is added to (stored in) the database).

In step 108, it is determined whether the updated database (with the augmented entity) contains enough images to train a model in step 109 with the augmented data from steps 101-108.

Thus, steps 101-108 can be considered a model training phase. In operation, the model can be implemented in an operating phase to filter, for example, searches. Thereby, some embodiments can apply entity-specific transforms as well as non-trivial entity level transformations, optimization of distortion models based on entity reconstruction performance, and can learn new transforms based on feedback.

That is, in operation, the method can receive feedback on whether or not the determination in step 108 was acceptable e.g., the database did (or did not) have enough entities in order to train the model. Intuitively, more entities means a better-trained model, subject to the trade-offs of cost and time associated with computing the additional entities. However, the feedback allows for a better determination in step 108, based on whether the model adequately achieves for the desired purpose. For example, in a facial recognition application: more augmented images for a given face will generally (but not necessarily) increase likelihood of the model correctly being used to identify a particular face).

In some embodiments, the structural element can be associated with an image feature, but the model trained based on image features other than an associated image feature.

It is noted that the entity is not limited to image augmentation and can include any entity (structural or unstructured). For example, sentence structures can be augments to train the model. If the sentence structure is "I go to work by car", the structural element can be the semantic meaning and words or phrases having a meaning similar to "go to" (e.g., travel to, commute to, etc.) can be associated with the object "go to". Or, errors can be introduced into the sentence structure such that when the model is in the operation phase, erroneous input can still be associated with the phrase "I go to work by car".

In one embodiment, the structural element can include grids. The grids can be associated with an image (i.e., placed on the image with the borders of the image as a reference) to simulate a laminated passport. The grid is superimposed on the image by adding the grid to the image and an augmented entity is created (i.e., by performing geometric transformations). Or, the structural element can include a rectangular block size of pixels. The block can be associated with the eyes of a facial image (i.e., to simulate a potential image of which the person's eyes are not visible) and the blocks can be superimposed on the image to remove (i.e., subtract) the eyes from the image. Then, the augmented image is generated. Thereby, a database can be created from a single image by changing the structural element to add or subtract noise from the image and augment the image with geometric transformations.

Therefore, the invention can provide a comprehensive approach to augment data exploiting the entire system workflow by modeling the distortions that an input can undergo as the media is captured, processed, and archived.

For example, a face recognition solution may result in different artifacts as a result of different resolution cameras, re-capture, compression/decompression, and printing (i.e., lamination). Also, portions of information not captured by the intrinsic representation can be represented. For examples, in PCA-based representation, the cut-off eigenvectors result in residues in reconstruction. Also, limitations such as artificial distance (e.g., e.g., Euclidean distance) metrics used can be learned. And, a system of engagement can be provided in which evolution due to wrinkling/scratching (of issued ID), aging (of person), and adversarial such as degradation due to intentional mutilation, etc.

Conventionally, in order to train entity (e.g., such as facial images, language, sentence fragments, etc.) recognition algorithms using deep learning networks, a plethora of samples (e.g., hundreds of millions of sample entities) are needed. Often many users do not have access to labeled data at this scale. Labeled data is exceptionally limited for particular applications such as surveillance, thereby limiting the expressive power of the models that can be reliably trained for such applications.

Thereby, the inventors have identified a technical problem in the conventional techniques in that the conventional techniques provide for very limited transformations and for not utilizing systemic information and narrowly focused on geometric transforms which as a result the resulting models are impoverished (i.e., lower performance), have an increased vulnerability (e.g., susceptible to attack), and impractical (e.g., not ready to be used in real deployed systems).

Thus, there is a need in the art to improve an available volume of data, preserving any label information (if applicable) such that the expanded data can be utilized for learning more robust feature representation/matching models as required and thereby accommodate models with large number of parameters to be optimized.

As will be discussed in more detail below, embodiments of the present invention can include a memory 28 having instructions stored therein to perform various aspects of the method depicted in FIG. 1.

Figure 2:
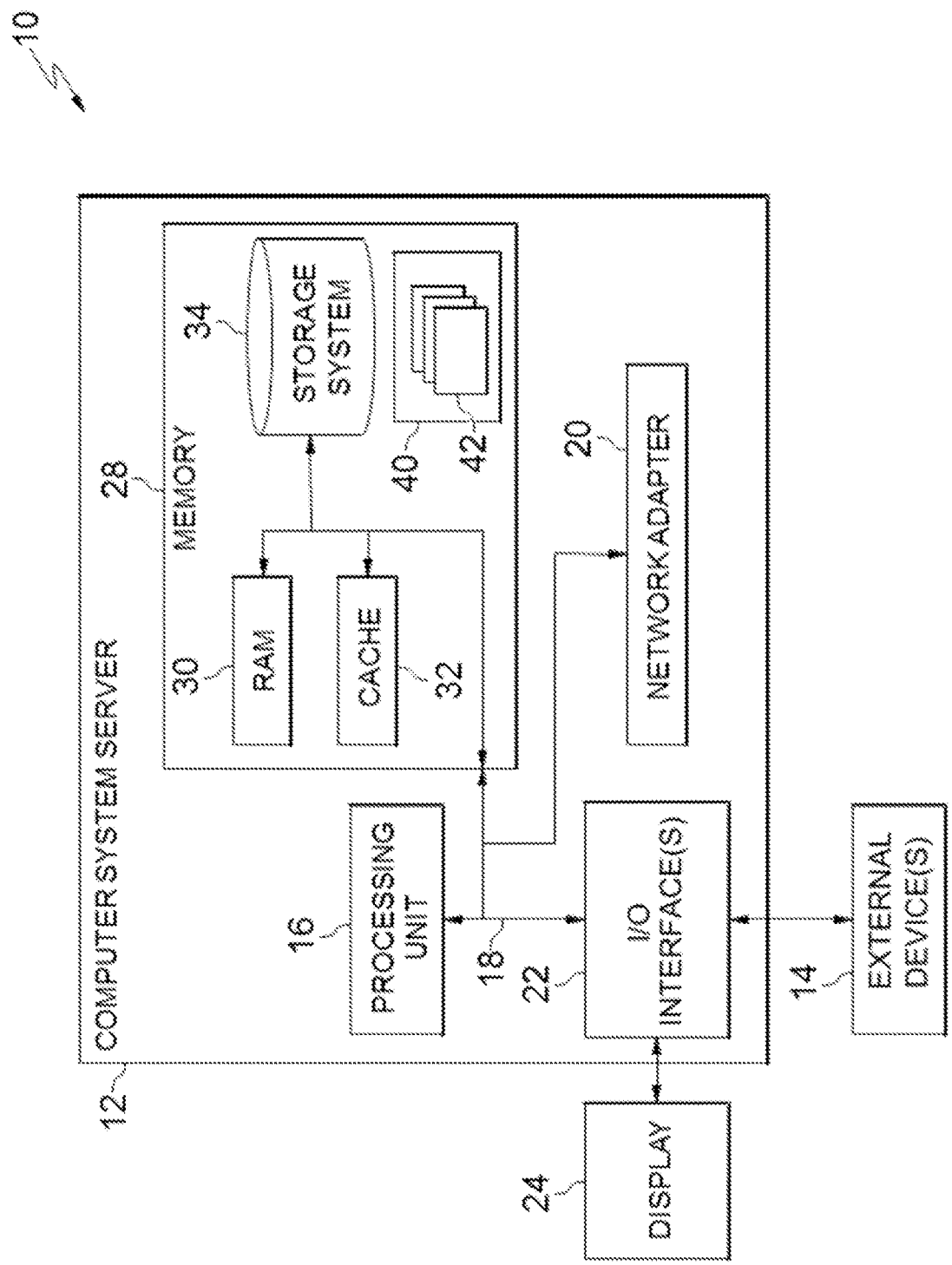
FIG. 2 depicts a system according to an embodiment of the present invention.

FIG. 2 depicts an exemplary system in accordance with the present invention. As depicted, computer system/server 12 is shown in the form of a general-purpose computing circuit. It is nonetheless understood that the system can operational with numerous other general purpose or special purpose computing system environments or configurations (not depicted). A few examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like. By way of further example (only) system/server may be practiced in a distributed cloud computing environment, where tasks are performed by remote processing circuits linked through a communications network.

Some embodiments describe one or more aspects of computer system/server 12 in the general context of computer system-executable instructions, such as program modules, being executed by the computer system. Generally, program modules may include routines, programs, objects, components, logic, data structures, and so on that perform particular tasks or implement particular abstract data types. In a distributed cloud computing environment, program modules may be located in both local and remote computer system storage media including memory storage circuits.

As depicted in FIG. 2, computer system/server 12 can include one or more processors or processing units 16, a memory 28, and a bus 18 that couples various system components including memory 28 to processor(s) 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and sometimes called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 include computer-executable software modules adapted to carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18.

It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 3 illustrates an exemplary cloud computing environment. As shown, cloud computing environment 50 comprises one or more cloud computing nodes 10 with which local computing circuits—such as, for example, personal digital assistant (PDA) or cellular telephone 54A, desktop computer 54B, laptop computer 54C, and/or automobile computer system 54N used by cloud consumers may communicate. With reference also to FIG. 2, cloud computing nodes 10 can include one or more systems/servers 12, running computer-executable software modules adapted to perform one or more aspects of methodologies of the present invention.

In some embodiments, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of local computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
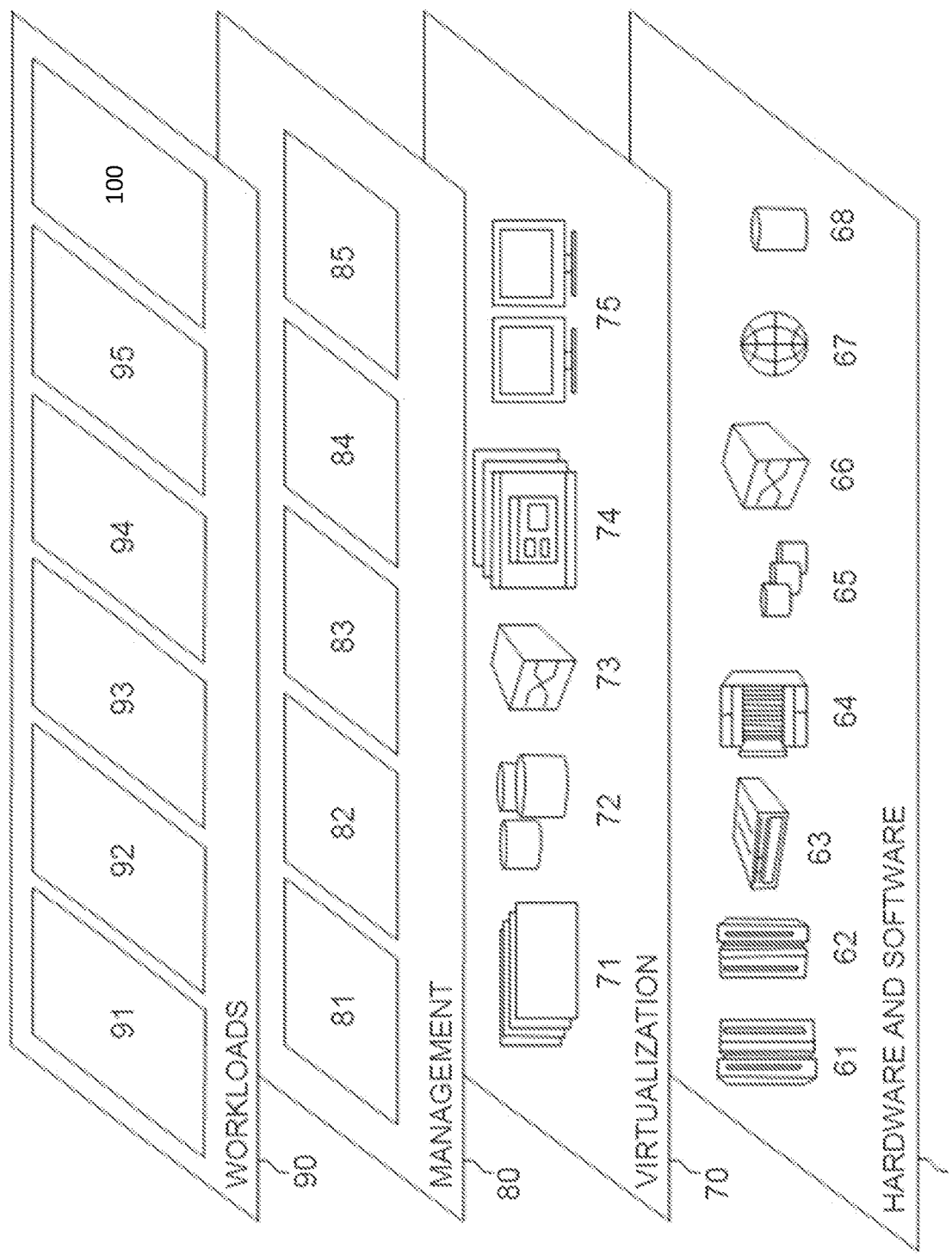
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and method 100 processing in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented entity learning recognition training method, comprising:
    obtaining an original image of a face from an augmented database;
    selecting a structural element from a plurality of structural elements, wherein the
    structural element comprises a shape associated with the face in the image;
    generating an augmented image of the face by combining the structural element with the
    original image of the face and adding the augmented image of the face to the augmented
    database; and training a model using augmented face images in the augmented database, wherein the training is based on a visual element portion of the augmented face images in the augmented database with added noise.

2. A computer program product comprising a computer-readable storage medium having program instructions embodied therewith, the program instructions executable by a computer to cause:
    obtaining an original image of a face from an augmented database;
    selecting a structural element from a plurality of structural elements, wherein the structural element comprises a shape associated with the face in the image; generating an augmented image of the face by combining the structural element with the original image of the face and adding the augmented image of the face to the augmented database; and training a model using augmented face images in the augmented database, wherein the training is based on a visual element portion of the augmented face images in the augmented database with added noise.

* * * * *